Sept. 2, 1924.

R. E. HELLMUND 1,506,750

OVERLOAD PROTECTION FOR GENERATORS

Filed Dec. 10, 1919

2 Sheets-Sheet 1

WITNESSES:

INVENTOR
Rudolf E. Hellmund
BY
ATTORNEY

Patented Sept. 2, 1924.

1,506,750

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

OVERLOAD PROTECTION FOR GENERATORS.

Application filed December 10, 1919. Serial No. 343,865.

*To all whom it may concern:*

Be it known that I, RUDOLF E. HELLMUND, a citizen of Germany and a resident of Swissvale, in the county of Allegheny and State of Pennsylvania, have invented a new and useful Improvement in Overload Protections for Generators, of which the following is a specification.

My invention relates to protective methods and apparatus for generators, such, for example, as are employed in substations for supplying high-voltage, direct-current energy to railway systems, and it has for its object to provide means whereby, upon the occurrence of a slight degree of overload, a negative compounding characteristic will be imparted to the generator and, upon the application of a more pronounced overload, the separate excitation of the generator will be entirely removed, whereby said generator will be effectually protected from the disastrous effects of overload.

Figure 1:
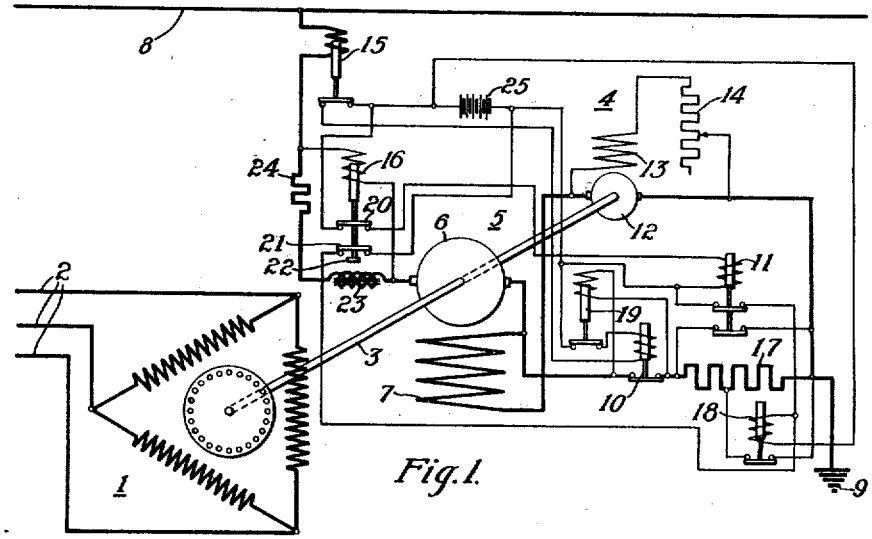
Figure 2:
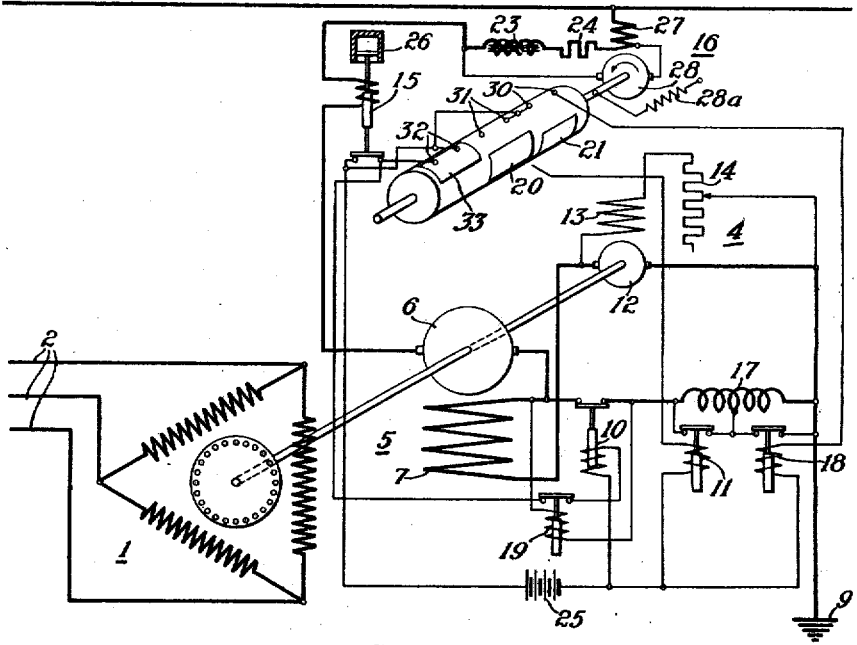
Figure 3:
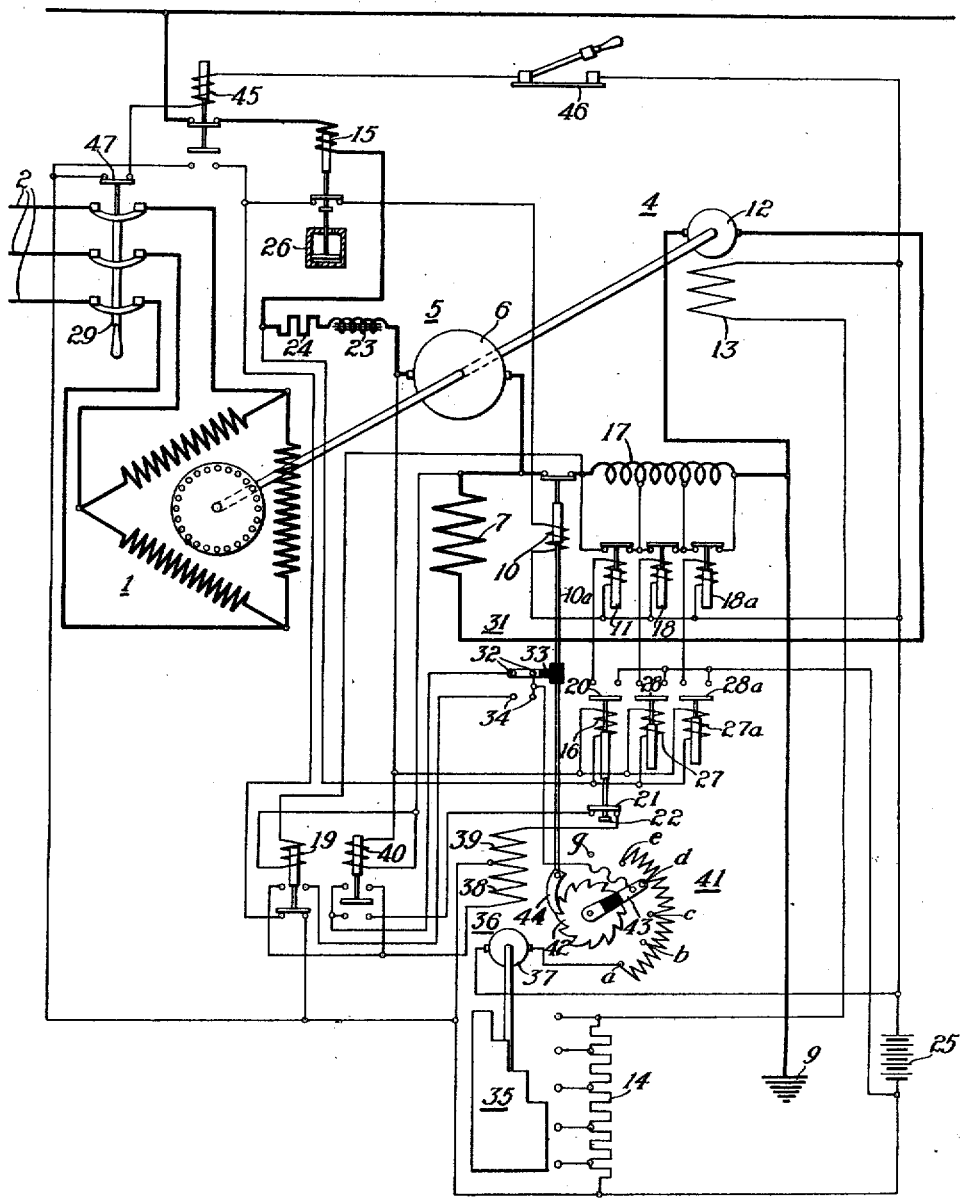

Referring to the accompanying drawing, Figure 1 is a diagrammatic view of a direct-current generator, together with suitable exciting and auxiliary apparatus, embodying one form of my invention, and Figs. 2 and 3 are views similar to Fig. 1 and embodying modifications in the system thereof.

More particularly, my invention is directed to the curing of conditions tending to cause flash overs on machines of the above designated character. I find, in this connection, that one of the principal causes for flashing, upon the establishment of a heavy overload or a short circuit, is the negative voltage which is established between the commutator segments near the toes of the brushes. This voltage comprises, principally, a rotational voltage which is negative on account of the excessive field distortion and on account of the self-induced voltage in the armature coils. I find, however, that if a decrease in the main field flux is effected at the same time, such change in flux will induce a positive voltage between the segments near the toes of the brushes.

Such a positive electromotive force will partially neutralize the negative voltages and, therefore, reduce, to a large extent, the flash-over tendency. Moreover, the decreased main field flux will indirectly reduce the size of the short-circuit current and, with it, further decrease the undesirable negative voltages.

Inasmuch as the self-induced voltage forms a large part of the negative flash-over producing voltage, especially in neutralized or compensated machines in which the negative rotational voltage is substantially eliminated, it follows that the flash-over voltage is, in a large part, dependent upon the rate of increase or rate of change of the load current, and not so much upon the absolute value thereof. I propose, therefore, to obtain the maximum protection against flash overs by providing protective relays which are dependent, in a large measure, upon the rate of change of the current.

Another object of my invention is to provide means whereby predetermined voltage conditions exist before the machine upon which a tendency to flash over has existed, can be reconnected, in the normal manner, to the system. In pursuance of this object, I so arrange the circuits of a system embodying my invention that the time between the prevention of the flash over and the reconnection of the machine, in the normal manner, is governed by the persistence of the abnormal overload conditions which are instrumental in causing the flash over.

Referring more particularly to the drawing, an alternating-current motor 1 derives energy from mains 2, and drives, by means of a shaft 3, an exciter machine 4 and a main generator 5, the latter comprising an armature member 6 and a main field winding 7. The generator 5 supplies energy to an overhead trolley system 8 and has its other terminal connected to ground at 9.

Switches 10 and 11 serve to connect the main field winding 7 to an armature member 12 of the exciter 4, and it should be noted that the same switches connect the main armature member 6 to the ground. The exciter machine 4 has a self-excited shunt field winding 13, the current in which may be adjusted by means of a rheostat 14.

Relays 15 and 16 govern the main and field circuit connections in conjunction with a resistor member 17 and the switches 10, 11 and 18. The actuating coil of the switch 10 is influenced by another relay 19, the particular connection for which will be more particularly described in conjunction with the operation of the system.

The armature of the relay 16 has mounted thereupon two contacting fingers 20 and 21, the contactor 20 being rigidly secured thereto, while the contactor 21 is free to slide thereupon and is lifted only when the armature is drawn up sufficiently for a cross member 22 to engage therewith. The actuating coil of the relay 16 is connected across an inductance element 23 and a resistance element 24, both of the latter elements being comprised in the main load circuit of the machine 5. In this connection, it should be observed that the commutating poles of the main generator may replace the separate inductance 23, and, moreover, that if the ohmic resistance thereof is sufficient, the resistance element 24 may also be omitted. A battery 25 supplies energy for the operation of the switches 10, 11 and 18.

Having described a system embodying one form of my invention, the operation thereof is as follows: The relays 15, 16 and 19 are normally in the down position, and, therefore, the switches 10, 11 and 18 are closed, thus establishing normal operating connections. Upon the occurrence of a severe short circuit or heavy overload, the current will rise at a high rate of change, thus causing a dangerous voltage of self-induction between the commutator segments, even before the current itself is increased to a large value. As heretofore pointed out, this self-induced voltage is, to a large extent, instrumental in initiating flash-overs, and, in order to obviate the occurrence of the latter, I make use of a relay of the inductive type to reduce the resultant excitation of the main field winding 7.

The rapid rate of current change will induce a considerable voltage across the member 23 which will, in turn, be sufficient to energize the coil of relay 16 and raise the armature thereof to such an extent that the contacts at 20 are opened. The opening of these contacts will, in turn, de-energize the actuating coil of the relay 11, whereupon, as shown, the left-hand portion of the resistor 17 will be placed in the field circuit 7 of the machine 5. This imparts to the generator a negative compound characteristic, thus lowering the field strength as the load current increases and giving the desired neutralization of the negative flashover initiating voltage heretofore described.

If, with the field thus reduced, the current persists in rising at an undesirable rate, the armature of the relay 16 is further raised until the cross member 22 lifts the contactor 21 and the switch 18 is thereby opened, whereupon the compound effect is increased still further by the introduction into the field circuit of the remainder of the resistor 17. It should be understood, of course, that, while I have shown only two portions of resistor, many more steps may be provided whereby to insert this resistor, the degree of smoothness of field excitation degrees being the controlling factor in the number of steps into which the resistance element is divided. It should be observed that the switch 18 is so interlocked, through the upper contactor on the armature of relay 11, that, even with relay 16 in its highest position, it cannot open unless relay 11 is already open.

While the flash-over tendency which is occasioned by a rapid change of current and the consequent self-induced negative voltage between segments is prevented by the above-switching sequence, it may, nevertheless, so happen that the load current may rise quite slowly to undesirable values, and ultimately attain such values that flash overs will tend to be initiated by the strength of the load current alone. If this condition exists, the armature of the relay 15 will rise and the actuating coil of the switch 10 will thereupon be de-energized, whereupon the normal main circuit between the overhead trolley 8 and the ground 9 will be opened and the current will pass from the armature winding 6 through the field winding 7 and the armature winding 12, and thence to ground at 9. If the main field flux, on account of the damping effect of the field structure, does not immediately die out and the generator action continues, the current in the main field winding reverses temporarily, and quickly reduces the field strength therein.

It will be observed that the resistance element 24 is likewise connected across the actuating coil of the relay 16. The resultant voltage occasioned by the ohmic drop therein can be so adjusted that the coil of the relay 16 will be operated even though the rate of current change is very low. This provision will, within permissible limits, so limit the overload current by the insertion of resistance in the armature circuit that flash-over initiation may be prevented without the interruption of generating service which is necessitated by the opening of the switch 10.

When the current of the generator is decreased sufficiently, the current relay 15 will drop and, with no additional interlocking, the switch 10 would immediately be closed, whereby the severe short circuit might be immediately re-established. I have, therefore, provided a relay 19 to prevent this occurrence. When the current is decreased to almost zero in the field winding 7, there is very little ohmic drop therein, and, consequently, the major portion of the exciter voltage exists across the contact points of the switch 10. This results in the energization of the coil of relay 19 and thus prevents the switch 10 from closing, even though the relay 15 is in the down position. The station operator must, therefore, lower the exciter voltage by adjustment of the resistance 14 until that voltage is small enough to allow relay 19 to drop thus closing the exciting and load circuits. Thereafter, the voltage can gradually be raised to its normal value, providing the short circuit or heavy overload has been eliminated.

The system may also be operated satisfactorily, if, after the switch 10 opens, the short circuit is cleared and the line voltage is maintained by the other generating sources. In this case, the generator 5 will temporarily operate as a series motor and will continue to do so as long as the switch 10 is in the open position. Here again, the exciter voltage must be adjusted until the voltage across the contacts of switch 10 is small enough to allow the relay 19 to drop.

In Fig. 2, I have illustrated a system which is, in most respects, similar to that described heretofore. The relay 15 is provided with a dash pot 26, whereby a time element is introduced into its operation and the main connections maintained if the overload is of short duration. Furthermore, the relay 16, in this modification, comprises a motor-type relay comprising an armature member 28, and a main field winding 27 excited by the load current. The armature member 28 is connected across the inductance element 23 and the resistance element 24, whereby the rotation thereof is governed, both by the amount of the overload current, and by its rate of change. The motor armature operates a drum upon which the contacts 20 and 21 perform the same circuit-closing functions as do the similarly numbered contacts in Fig. 1, the contact 20 co-operating with terminals 31 and the contact 21 co-operating with terminals 30. The switch 11 is controlled through the contacts 31, and the switch 18 is likewise controlled at a later point in the rotational movement of the armature 28, in the direction indicated, through the terminals 30.

Through the above instrumentalities, a rapidly increasing load current will first connect terminals 31 through the contact 20 and, thereupon, open the switch 11. If the high rate of change persists, the contact 21 connects the terminals 30 and opens the switch 18, the same functions being performed by the connections so established, as was explained in connection with Fig. 1. In addition, a contact member 33 coacts with, and operates to disconnect, terminals 32, whereby after a sustained severe overload has lifted the relay 15, the switch 10 is opened. The remainder of the operation of this system is the same as that described in connection with Fig. 1.

Turning now to Fig. 3, I have illustrated a system wherein, in addition to the functions above ascribed to my invention, I show means whereby the time between the opening of the load circuit and the closing thereof, is made dependent upon the persistence and severity of the overload conditions. In this system, the resistance 17 comprises three portions, and, therefore, in addition to the switches 11 and 18, a switch 18a is used to introduce the last section of the resistance into the load circuit.

It will be observed that the exciter field winding 13 is excited from the battery 25, whereby the voltages of the exciter machine and of the main machine may be regulated to very low values before the switch 10 is closed after the elimination of short-circuit conditions. Such low-voltage regulation is usually impossible with a self-excited machine. Three relays 16, 27' and 27a govern the switches 11, 18 and 18a, respectively, in place of the single relay 16 which performs an analogous function in the heretofore described systems. Contact members 28' and 28a are associated with the relays 27' and 28a. A main switch 29 is provided to connect the alternating-current mains 2 with the driving motor 1.

The armature of the switch 10 extends downwardly as a rod 10a which carries a contact member 33' rigidly connected thereto, the function of which is analogous to the contactor 33 in Fig. 2, it being observed that contactor 33' coacts with the terminals 32'. When the rod 10a and the contact member 33' move downwardly, the connection is transferred to terminals 34, as shown.

The field rheostat 14 of the exciter field winding 13 is inserted by degrees therein through a drum controller 35 which is actuated by a pilot motor 36, the latter comprising an armature member 37 and a two-part field winding 38—39. With the switch 10 closed, a voltage relay 40 controls the operation of the pilot motor 36, thus effecting automatic voltage regulation, for purposes to be here hereinafter described. When the switch 10 is opened, the pilot motor control is transferred from the relay 40 to the relay 19 by reason of the downward movement of the contact member 33' and the consequent connecting together of the terminals 34.

The speed of the pilot motor may be reduced by the insertion in the armature circuit thereof of a resistor 41 which, under normal conditions, is entirely out of circuit. A contacting arm 43 is adapted to sweep over the portions of the resistor 41 and is mounted upon a ratchet wheel 42 which is moved one step each time the switch 10 opens, through the instrumentality of the rod 10a and a pawl 44. A line switch 45 is provided for opening the main load circuit and is operated in conjunction with auxiliary terminals 47 of the switch 29.

The operation of the system described in Fig. 3 is as follows: After the dynamo-electric set is started and the switch 29 is closed, the main generator may be excited, and, since the relays 16, 27' and 27a are in the down position, the associated switches 11, 18 and 18a are closed. The relay 15 is down and the switch 45 is open, whereby the lower auxiliary contacts of the latter are closed so that the coil of the switch 10 is energized and the switch itself is held in a closed position. When the latter is in its closed position, the relay 40 is connected across the armature member 6.

I will now describe the operation of the system of Fig. 3, in so far as to establishment of predetermined voltage conditions is concerned. If the voltage of the machine 5 is low, the lower contacts of the relay 40 close the pilot motor circuit with the field winding 39 effective, and this operates the pilot motor in such direction as to reduce the amount of the resistance 14 which is connected in circuit with the field winding 13 of the exciter 4, whereby the voltage of the machine 5 is raised. If, on the other hand, the voltage of the machine 5 is too high, the upper contacts of the relay 40 are connected together and the pilot motor 36 is operated in the opposite direction and the voltage is reduced on account of the decreased excitation furnished by the machine 4.

After the generator voltage is thus automatically controlled to the proper value, the switch 46 may be closed, either manually or automatically, and if switch 29 is also closed, the switch 45 is energized and closed. Although this switching sequence opens the lower auxiliary contacts of switch 45, the switch 10 remains closed because the relay 19 is in its lower position and thus establishes a closed energizing circuit for the coil of the switch 10. With the line switch 45 closed, the automatic voltage regulation continues as above described.

Considering now the operation of the above system when a short circuit or heavy overload exists thereupon and tends to initiate a flash-over on the machine 5, it will be understood that the operation of the various elements, aside from the part played by the above-described voltage-regulation devices, is substantially the same as the similarly numbered switches and circuits in the heretofore described systems of Figs. 1 and 2. The relay 16, having the lowest setting, lifts first and opens the switch 11, thus giving the generator the required negative compound characteristic. At substantially the same time, however, the voltage-raising circuit of the pilot motor 36; that is, the field circuit which causes the rotation of that motor in such a direction that the resistance 14 is reduced, is opened by the lifting of the contact member 21 through the cross member 22.

If, after the switch 11 has opened, the undesirable conditions still exist, the relay 27' functions and opens switch 18, and if the amount of resistance inserted in the field circuit is still insufficient for the purpose desired, the relay 27a will rise and open the switch 18a. Upon the clearing of the short circuit, the relays 16, 27' and 27a drop in the reverse order and reclose the switches 11, 18 and 18a, thereby automatically re-establishing normal operation. The impedance or resistor 17 can be so adjusted that when it is all inserted in the circuit, the current, even with a dead short on the line, is held down to a permissible value.

If the short-circuit conditions persist and the current increases to a high value, the current relay 15, retarded by the dash pot 26, will lift its contact member and thereby open the switch 10. The effect of the opening of the latter is the same as was described in connection with the systems of Figs. 1 and 2. Since the relay 19 has lifted, the switch 10 cannot be reclosed even after the relay 15 drops, upon the decrease of the current in the actuating coil of the latter relay. When the relay 10 is in the down position and, therefore, the contacts 34 are connected, the pilot motor 36 is started in such direction that the amount of the resistance 14 in circuit is increased until there is but little voltage across the relay 10, whereupon, the relay 19 drops, and the switch 10 may reclose.

The pilot motor will, however, run at a reduced speed because the downward movement of the armature of the switch 10 results in the moving of the pawl-and-ratchet mechanism to shift the contact arm 43 over one division of the resistance member 41, that is, from $a$ to $b$. This reduced pilot-motor speed increases the time which must elapse between the opening and reclosing of the switch 10. When the latter is reclosed, the automatic voltage regulation, heretofore described, is re-established and either raises the generator voltage to its normal value, if the short circuit has cleared, or, if the latter still persists, the relay 15 again rises and the switch 10 is again opened. The same cycle of operation is now repeated but at a still lower speed of the pilot motor because the last-mentioned downward movement of the armature 10 when that switch opens has moved the contact arm from $b$ to $c$.

Thus, the time between the opening and the closing of the switch 10 is increased each time that the automatic reconnection of the machines to the line reveals the fact that the short-circuit conditions still exist, and if the undesirable conditions have not been eliminated by the time the lever reaches the position $g$, the pilot motor circuit is opened. Under these conditions, the exciter voltage cannot be further lowered, and, therefore, the relay 19 is held in its raised position which precludes the closing of the switch 10. The circuit will, therefore, not automatically reclose until the arm 43 is moved backwardly after releasing the pawl 44. I find that in all cases, it is beneficial, after the switch has opened one or more times and after the short-circuit condition has been cleared, for the operator to manually move the arm 43 back to the position *a*.

While I have described several embodiments of my invention, it is obvious that many changes may be made therein without departing from the spirit thereof, and I desire, therefore, that it shall be limited only by the showing of the prior art or by the scope of the appended claims.

I claim as my invention:

1. In combination with a dynamo-electric machine, means governed by overload current conditions for opening the generating load circuit thereof, and means for preventing the closing of said circuit until the possibility of excessive load current flow is removed.

2. In combination with a dynamo-electric machine, overload protecting means for opening the generating load circuit, and means for preventing the closing of said circuit until the field excitation has been reduced below a predetermined value.

3. In combination with a dynamo-electric machine, overload protecting means for opening the generating load circuit, and means for preventing the closing of said circuit during the existence of the overload except at a reduced voltage of said machine.

4. In combination with a dynamo-electric machine, means comprising an inductive relay responsive to the rate of change of current in said machine for reducing the resultant field excitation thereof, the effectiveness of said means corresponding to the intensity of said rate of change, and means comprising a resistance element associated with said inductive relay, whereby the latter is also adapted to function in response to a slow increase of said current, and further means responsive to large increases in said current for opening the generating load circuit of said machine.

5. In combination with a dynamo-electric machine, an exciter therefor comprising a separately excited field winding, means for opening the generating load circuit of said dynamo-electric machine, and means for varying the excitation of said exciter field winding in response to the opening of said load circuit.

6. In combination with a dynamo-electric machine, an exciter machine therefor comprising an exciting field winding, means for varying said exciter excitation, means for varying the resultant excitation of the main dynamo-electric machine in response to the rate of change of the current therein, and means whereby an increase in the exciter field strength is prevented upon a decrease in the main machine excitation.

7. In combination with a dynamo-electric machine, an exciter machine therefor comprising an exciting field winding, means comprising a rheostat operated by a pilot motor for varying said exciter excitation, means for varying the resultant excitation of the main dynamo-electric machine in response to the rate of change of the current therein, and means whereby said pilot motor cannot move to increase the exciter excitation upon a decrease in the main machine excitation.

8. In combination with a dynamo-electric machine, an exciter machine therefor comprising an exciting field winding, means for varying said exciter excitation, means for varying the resultant excitation of the main dynamo-electric machine in response to the rate of change of the current therein, means whereby an increase in the exciter field strength is prevented upon a decrease in the main machine excitation, and means operating to re-establish said load circuit, said means being effective to permanently re-establish said circuit only when predetermined voltage conditions exist.

9. In combination with a dynamo-electric machine, an exciter machine therefor comprising an exciting field winding, means for varying said exciter excitation, means for varying the resultant excitation of the main dynamo-electric machine in response to the rate of change of the current therein, means whereby an increase in the exciter field strength is prevented upon a decrease in the main machine excitation, means operating to re-establish said load circuit, and means whereby the time between the opening and closing of said circuit-opening means is made dependent upon the persistence of the overload condition.

10. In combination with a dynamo-electric machine, an exciter machine therefor comprising an exciting field winding, means for opening the load circuit of said dynamo-electric machine in response to an overload condition, means for re-establishing said circuit upon the existence of proper voltage conditions, and means whereby the time between the opening and closing of said circuit-opening means is made dependent upon the persistence of the overload condition.

11. In combination with a dynamo-electric machine, an exciter machine therefor comprising an exciting-field-winding means for varying said exciter excitation, means for varying the resultant excitation of the main dynamo-electric machine in response to the rate of change of the current therein, means whereby an increase in the exciter field strength is prevented upon a decrease in the main machine excitation, means operating to re-establish said load circuit, means whereby the time between the opening and closing of said circuit-opening means is made dependent upon the persistence of the overload condition, and means governed by the circuit-opening means for determining the time which elapses before said voltage conditions are satisfied.

12. In combination with a dynamo-electric machine, means for modifying the shape of the inherent voltage characteristic thereof, and means for actuating said first-mentioned means in response to the rate of change of the load current of said machine.

13. In combination with a dynamo-electric machine normally having a substantially constant voltage characteristic, means for imparting a negative compound characteristic thereto while maintaining the operative machine connections, and means dependent upon the rate of change of the load current of said machine for controlling the operation of said first-mentioned means.

14. In combination with a dynamo-electric machine normally having a substantially constant voltage characteristic, means for imparting a negative compound characteristic, and means dependent upon the rate of change of the load current of said machine for controlling the operation of said first-mentioned means.

15. In combination with a dynamo-electric generator, means dependent upon predetermined conditions of the load current for automatically converting the generator into a series motor, and automatic means for subsequently re-establishing normal generator connections.

16. In combination with a dynamo-electric machine, automatic means for changing the main machine characteristic upon predetermined load-current conditions, and automatic means responsive to the discontinuance of said load-current conditions for subsequently re-establishing normal operating characteristics.

17. In combination with a dynamo-electric machine, automatic means for interrupting the normal generating circuit upon predetermined load conditions, means for subsequently reclosing said circuit after every interruption, and automatic means for increasing the time interval between the interruption and the reclosing for each successive operation.

18. A direct-current generator including an armature circuit, a field winding, an exciter, an impedance device, means for providing a pair of divided paths for said armature circuit, said divided paths including, respectively, said field winding and said impedance device, means for serially connecting said exciter in one of said divided paths in such manner that the electromotive force of the exciter is opposed to the electromotive-force drop resulting from the flow of the armature current through the impedance device, and means responsive to overload conditions for open-circuiting the path including said impedance device.

19. A direct-current generator including an armature circuit, a field winding, an exciter, an impedance device, means for connecting said impedance device in series with said armature circuit, means for serially connecting said field winding and said exciter in shunt with said impedance device in such manner that the electromotive force of the exciter is opposed to the electromotive-force drop resulting from the flow of the armature current through the impedance device, and means responsive to overload conditions for open-circuiting the path including said impedance device.

20. A direct-current generator including an armature circuit, a field winding, an exciter, an impedance device, means for providing a pair of divided paths for said armature circuit, said divided paths including, respectively, said field winding and said impedance device, means for serially connecting said exciter in one of said divided paths in such manner that the electromotive force of the exciter is opposed to the electromotive-force drop resulting from the flow of the armature current through the impedance device, means responsive to overload conditions for open-circuiting the path including said impedance device, and means for preventing the reclosure of said path until the effective exciter electro-motive force has been reduced to a predetermined value.

21. A direct-current generator including an armature circuit, a field winding, an exciter, an impedance device, means for connecting said impedance device in series with said armature circuit, means for serially connecting said field winding and said exciter in shunt with said impedance device in such manner that the electromotive force of the exciter is opposed to the electromotive-force drop resulting from the flow of the armature current through the impedance device, means responsive to overload conditions for open-circuiting the path including said impedance device, and means for preventing the reclosure of said path until the effective exciter electromotive force has been reduced to a predetermined value.

22. A direct-current generator including an armature circuit, a field winding, an exciter, an impedance device, means for providing a pair of divided paths for said armature circuit, said divided paths including, respectively, said field winding and said impedance device, means for serially connecting said exciter in one of said divided paths in such manner that the electromotive force of the exciter is opposed to the electromotive-force drop resulting from the flow of the armature current through the impedance device, means responsive to overload conditions for open-circuiting the path including said impedance device and for reducing the effective exciter electromotive force, and means for reclosing said path when the effective exciter electromotive force has been reduced to a predetermined value.

23. A direct-current generator including an armature circuit, a field winding, an exciter, an impedance device, means for connecting said impedance device in series with said armature circuit, means for serially connecting said field winding and said exciter in shunt with said impedance device in such manner that the electromotive force of the exciter is opposed to the electromotive-force drop resulting from the flow of the armature current through the impedance device, means responsive to overload conditions for open-circuiting the path including said impedance device and for reducing the effective exciter electromotive force, and means for reclosing said path when the effective exciter electromotive force has been reduced to a predetermined value.

24. A direct-current generator including an armature circuit, a field winding, an exciter, a variable impedance device, means for providing a pair of divided paths for said armature circuit, said divided paths including, respectively, said field winding and said impedance device, means for serially connecting said exciter in one of said divided paths in such manner that the electromotive force of the exciter is opposed to the electromotive-force drop resulting from the flow of the armature current through the impedance device, and means responsive to overload conditions for varying said impedance device.

25. A direct-current generator including an armature circuit, a field winding, an exciter, a variable impedance device, means for connecting said impedance device in series with said armature circuit, means for serially connecting said field winding and said exciter in shunt with said impedance device in such manner that the electromotive force of the exciter is opposed to the electromotive-force drop resulting from the flow of the armature current through the impedance device, and means responsive to overload conditions for varying said impedance device.

26. A direct-current generator including an armature circuit, a field winding, an exciter, a variable impedance device, means for providing a pair of divided paths for said armature circuit, said divided paths including respectively, said field winding and said impedance device, means for serially connecting said exciter in one of said divided paths in such manner that the electromotive force of the exciter is opposed to the electromotice-force drop resulting from the flow of the armature current through the impedance device, and means for causing the impedance of said impedance device to increase in response to abnormal rates of increase of the armature current.

27. A direct-current generator including an armature circuit, a field winding, an exciter, a variable impedance device, means for connecting said impedance device in series with said armature circuit, means for serially connecting said field winding and said exciter in shunt with said impedance device in such manner that the electromotive force of the exciter is opposed to the electromotive-force drop resulting from the flow of the armature current through the impedance device, and means for causing the impedance of said impedance device to increase in response to abnormal rates of increase of the armature current.

28. A direct-current generator including an armature circuit, a field winding, an exciter, a variable impedance device, means for providing a pair of divided paths for said armature circuit, said divided paths including, respectively, said field winding and said impedance device, means for serially connecting said exciter in one of said divided paths in such manner that the electromotive force of the exciter is opposed to the electromotive-force drop resulting from the flow of the armature current through the impedance device, and means responsive to both the value and the rate of change of the armature current for varying said impedance device.

29. A direct-current generator including an armature circuit, a field winding, an exciter, a variable impedance device, means for connecting said impedance device in series with said armature circuit, means for serially connecting said field winding and said exciter in shunt with said impedance device in such manner that the electromotive force of the exciter is opposed to the electromotive-force drop resulting from the flow of the armature current through the impedance device, and means responsive to both the value and the rate of change of the armature current for varying said impedance device.

In testimony whereof, I have hereunto subscribed my name this 2nd day of December 1919.

RUDOLF E. HELLMUND.